United States Patent
Khatwa

(10) Patent No.: US 7,403,132 B2
(45) Date of Patent: *Jul. 22, 2008

(54) SYSTEM AND METHOD FOR MANAGEMENT OF A GROUND OBSTACLE DISPLAY

(75) Inventor: Ratan Khatwa, Sammamish, WA (US)

(73) Assignee: Honeywell International Inc., Morristown, NJ (US)

( * ) Notice: Subject to any disclaimer, the term of this patent is extended or adjusted under 35 U.S.C. 154(b) by 230 days.

This patent is subject to a terminal disclaimer.

(21) Appl. No.: 10/907,940

(22) Filed: Apr. 21, 2005

(65) Prior Publication Data

US 2006/0238376 A1     Oct. 26, 2006

(51) Int. Cl.
*G08G 5/04*      (2006.01)

(52) U.S. Cl. ...................................... 340/970

(58) Field of Classification Search ................. 340/970, 340/961; 701/300–302
See application file for complete search history.

(56) References Cited

U.S. PATENT DOCUMENTS

| | | | | |
|---|---|---|---|---|
| 4,224,669 A | * | 9/1980 | Brame | 701/8 |
| 5,111,400 A | * | 5/1992 | Yoder | 701/3 |
| 5,448,233 A | * | 9/1995 | Saban et al. | 340/963 |
| 6,289,277 B1 | * | 9/2001 | Feyereisen et al. | 701/202 |
| 6,473,003 B2 | * | 10/2002 | Horvath et al. | 340/945 |
| 6,653,947 B2 | * | 11/2003 | Dwyer et al. | 340/970 |
| 6,691,004 B2 | * | 2/2004 | Johnson et al. | 701/14 |
| 6,745,115 B1 | * | 6/2004 | Chen et al. | 701/9 |
| 6,973,386 B2 | * | 12/2005 | Gibbs | 701/208 |
| 7,098,809 B2 | * | 8/2006 | Feyereisen et al. | 340/963 |
| 2004/0239529 A1 | * | 12/2004 | Tran | 340/961 |

FOREIGN PATENT DOCUMENTS

WO    WO0039775    *  7/2000

* cited by examiner

*Primary Examiner*—Benjamin C Lee
(74) *Attorney, Agent, or Firm*—Black Lowe & Graham PLLC

(57) ABSTRACT

A system and methods for managing a visual display in a ground proximity warning system is disclosed. In one embodiment, a system includes at least one aircraft sensor system operable to acquire aircraft data and a ground proximity warning computer coupled to the aircraft sensor system that is operable to process the aircraft data to generate ground proximity warning data corresponding to a sensed ground obstruction. An indicating system including at least one visual display device that is configured to display an image of a visual symbol corresponding to the sensed ground obstruction is coupled to the computer. At least one of the computer and the visual display device is controllable to selectively alter an appearance of the visual symbol on the display.

8 Claims, 5 Drawing Sheets

SYSTEM AND METHOD FOR MANAGEMENT OF A GROUND OBSTACLE DISPLAY

BACKGROUND OF THE INVENTION

Ground proximity warning systems (GPWS) are known and are presently installed on a wide variety of aircraft. Such systems generally provide both aural and visual warnings of inadvertent aircraft descent during flight operations. For example, a GPWS may be configured to detect an excessive loss of altitude during a landing procedure, following a take-off, or during a go-around following a missed landing approach. The GPWS also advantageously provides aural and visual warnings of potential terrain collisions during controlled flight over relatively high altitude terrain. In general, the GPWS detects an altitude loss by computing a barometric altitude (MSL) and a descent rate based upon changes in the barometric pressure. In cases where the terrain underlying the aircraft is rising relative to the aircraft, a radio altitude is computed in order to determine an altitude above ground level (AGL).

Although present ground proximity warning systems significantly enhance the safety of flight, other potentially hazardous terrain obstructions nevertheless exist. For example, radio transmission towers, smokestacks and other similar structures abruptly project outwardly from the terrain. Obstructions of the foregoing type are generally depicted in various aeronautical publications (including, for example, the well-known terminal area chart (TAC), sectional aeronautical chart (SAC) and world aeronautical chart (WAC)) and may also be represented in a variety of commonly available navigational databases that may be accessed by the ground proximity warning system so that a symbolic representation of obstacle may be displayed on a terrain awareness display (TAD) located within the aircraft.

Although the display of ground obstacles on a TAD constitutes a significant contribution to flight safety, various potential drawbacks may nevertheless exist. For example, the symbol associated with the ground obstacle may not be readily distinguishable from a terrain depiction on the TAD, so that a flight crew may fail to properly observe the obstacle on the TAD. In a further example, the terrain depiction associated with a selected geographical location may provide too many ground obstruction symbols, so that the TAD becomes excessively cluttered, which may be confusing to the flight crew.

What is needed in the art is a system and method for managing a visual display so that ground obstructions may be effectively recognized by the flight crew.

BRIEF SUMMARY OF THE INVENTION

A system and methods for managing a visual display in a ground proximity warning system is disclosed. In one aspect, a system includes at least one aircraft sensor system operable to acquire aircraft data and a ground proximity warning computer coupled to the aircraft sensor system that is operable to process the aircraft data to generate ground proximity (or obstacle) warning data corresponding to a sensed ground obstruction. An indicating system including at least one visual display device that is configured to display an image of a visual symbol corresponding to the sensed ground obstruction is coupled to the computer. At least one of the computer and the visual display device is controllable to selectively alter an appearance of the visual symbol on the display.

BRIEF DESCRIPTION OF THE SEVERAL VIEWS OF THE DRAWING

The preferred and alternative embodiments of the present invention are described in detail below with reference to the following drawings.

DETAILED DESCRIPTION OF THE INVENTION

The present invention relates to ground proximity warning systems and methods. Many specific details of certain embodiments of the invention are set forth in the following description and in FIGS. 1 through 5 to provide a thorough understanding of such embodiments. One skilled in the art, however, will understand that the present invention may have additional embodiments, or that the present invention may be practiced without several of the details described in the following description.

Figure 1:
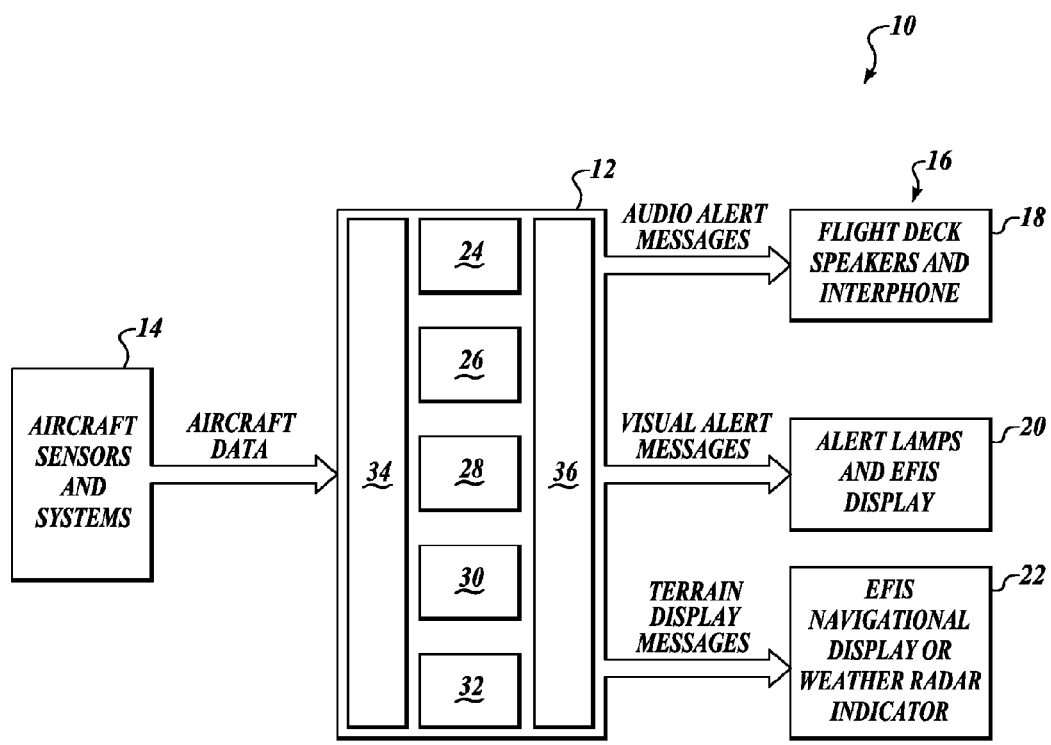
FIG. 1 is a block diagrammatic view of a ground proximity warning system according to an embodiment of the invention.

FIG. 1 is a block diagrammatic view of a ground proximity warning system 10 according to an embodiment of the invention. The system 10 includes a ground proximity-warning computer 12 that is coupled to a plurality of aircraft sensors 14 and associated systems, including, for example, pitot-static sensors and an air data system. The system 10 is also coupled to one or more indicating systems 16, which are operable to convey audio and/or visual warnings to a flight crewmember. Accordingly, the one or more indicating systems 16 may include a flight deck speaker and interphone system 18, an alert lamp and electronic flight instrument system (EFIS) indicating system 20, and an EFIS navigational display and weather radar display system 22. The indicating systems 16 may also be coupled to various devices that permit a flight crewmember to communicate with the system 10. For example, the various devices may include a keyboard, a pointing device, including a "mouse" or a trackball, or other similar devices operable to transfer commands to the system 10.

The ground proximity-warning computer 12 includes one or more processors that are configured to perform a variety of functions. For example, the computer 12 may include a GPWS processor 24 that is operable to execute various algorithms to detect a ground (or obstacle) proximity event, and also includes algorithms configured to manage the display of obstacles on a selected display device, as will be described in greater detail below in connection with other embodiments of the invention. An aural callout processor 26 operable to generate audio warnings associated with ground (or obstacle) proximity events may also be present. A terrain awareness and obstacle alerting processor 28 is also present in the computer 12 that is operable to process information from the aircraft sensors 14 and systems 14 and to execute algorithms to obtain terrain obstacles so that appropriate warnings based upon the terrain obstacles may be obtained. A terrain clearance floor processor 30 may also be present in the computer 12 that processes terrain floor algorithms to generate terrain floor information for display. A windshear detection and alerting processor 32 processes windshear algorithms and similarly generates windshear information for display. The computer 12 also includes an input processing module that processes the signals obtained from the aircraft sensors and systems 14 to appropriately format the signals prior to transferring the signals to the GPWS processor 24, the aural callout processor 26, the terrain awareness and obstacle alerting processor 28, the terrain clearance floor processor 30, and the windshear detection and alerting processor 32. An output processor 36 receives processed signals from the GPWS processor 24, the aural callout processor 26, the terrain awareness and obstacle alerting processor 28, the terrain clearance floor processor 30, and the windshear detection and alerting processor 32 and appropriately formats the processed signals before transferring the signals to the flight deck speaker and interphone system 18, the alert lamp and electronic flight instrument system (EFIS) indicating system 20, and the EFIS navigational display and weather radar display system 22.

Figure 2:
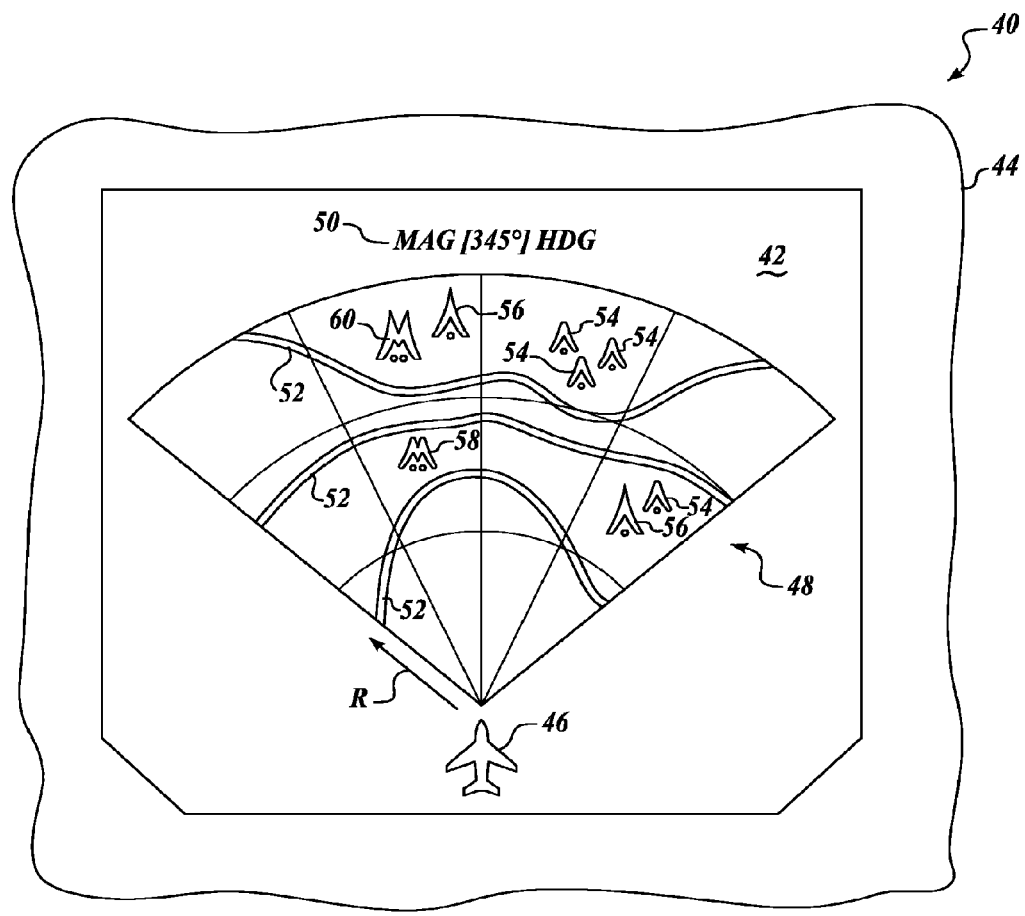
FIG. 2 is a ground obstacle depiction that describes a method of display management according to another embodiment of the invention.

FIG. 2 is a ground obstacle depiction 40 formed according to another embodiment of the invention. The ground obstacle depiction 40 may presented to a viewer, such as a flight crew member, on a viewing surface 42 of a terrain awareness display (TAD) 44 positioned on an aircraft flight deck. The TAD 44 may be the foregoing EFIS navigational display and weather radar display system 22 of FIG. 1, or other similar display devices. The TAD 44 is generally configured to display a symbolic representation 46 of the aircraft, and a viewing sector 48 that extends radially outwardly from the symbolic representation 46 of the aircraft. The TAD 44 is also configured to display terrain obstructions, aircraft traffic, navigational information and/or weather obstructions within a predetermined range and bearing relative to the aircraft. Accordingly, the viewing sector 48 also typically includes a directional bearing 50 of the aircraft. In general, the range R of the viewing sector 48 is selectable and alterable by a flight crew member to provide a desired resolution on the viewing surface 42 of the TAD 44

The sector 48 also includes a graphical representation of terrain contours 52 that depict different terrain elevations in proximity to the aircraft. The terrain contours 52 may further enclose terrain regions having different colors that correspond to differences in elevation. For example, in one embodiment a terrain elevation that is more than two-thousand feet below an aircraft altitude typically appears as a black area on the viewing surface 42, while a terrain elevation that is between approximately two-thousand feet below the aircraft altitude and up to the aircraft altitude is shown as a green area on the viewing surface 42. Terrain having an elevation that is above the aircraft altitude is shown as a yellow area if the terrain is between the aircraft altitude and extending up to approximately two-thousand feet above the aircraft altitude. If a terrain elevation is more than about two-thousand feet above the altitude of the aircraft, it is typically shown as a red area on the viewing surface 42.

Still referring to FIG. 2, the viewing sector 48 also includes at least one first ground obstruction symbol 54 that represents a ground obstacle such as a radio transmission antenna or a smokestack, or other similar obstructions that do not extend more than one-thousand feet above the underlying terrain (AGL), while a second ground obstruction symbol 56 represents an obstruction that extends more than one-thousand feet AGL. Other ground obstruction symbols may also be present to conveniently represent a group of ground obstacles that are in close relative proximity to each other. Accordingly, a first group obstruction symbol 58 represents a group obstruction such as a radio antenna farm or an industrial installation having a plurality of towers or smokestacks, or other similar collections of obstructions that do not extend more than one-thousand feet above the underlying terrain (AGL), while a second group obstruction symbol 60 represents a group obstruction that extends more than one-thousand feet AGL. Although the symbols 54, 46, 58 and 60 as shown in FIG. 2 generally conform to ICAO standards for ground obstruction symbology, it is understood that other symbols that do not conform to the ICAO standard may also be used to indicate obstructions within the viewing sector 48. Moreover, it is understood that a selected one of the first ground obstruction symbol 54 and the second ground obstruction symbol 56 may be used to indicate single ground obstructions. Similarly, a selected one of the first group obstruction symbol 58 and the second group obstruction symbol 60 may be used to indicate group ground obstructions.

In selected instances, the number of symbols 54, 46, 58 and 60 presented on the TAD 44 may partially obscure or detract from the terrain depiction on the viewing surface 42. For example, the symbols 54, 46, 58 and 60 may partially obscure the terrain contours 52. Accordingly, in one particular embodiment of the invention, a first display mode may be selected that excludes the symbols 54, 46, 58 and 60 from the viewing surface 42 of the TAD 44. The first display mode may be manually selectable by a flight crewmember by activating a manual control associated with the system 10 of FIG. 1. For example, the manual selection may be a keyboard input command, or alternately, the manual selection may be a push button present on a display panel of the TAD 44. Alternately, in other selected instances, it may be advantageous to exclude the terrain depiction from the viewing surface 42 of the TAD 44 so that only the symbols 54, 46, 58 and 60 are presented on the TAD 44. Accordingly, in another particular embodiment of the invention, a second display mode may be selected that excludes the terrain depiction from the viewing surface 42 of the TAD 44. The second display mode may also be manually selectable by a flight crewmember by activating a manual control associated with the system 10, such as through a keyboard input command, or alternately, by means of a push button present on a display panel of the TAD 44.

Figure 3:
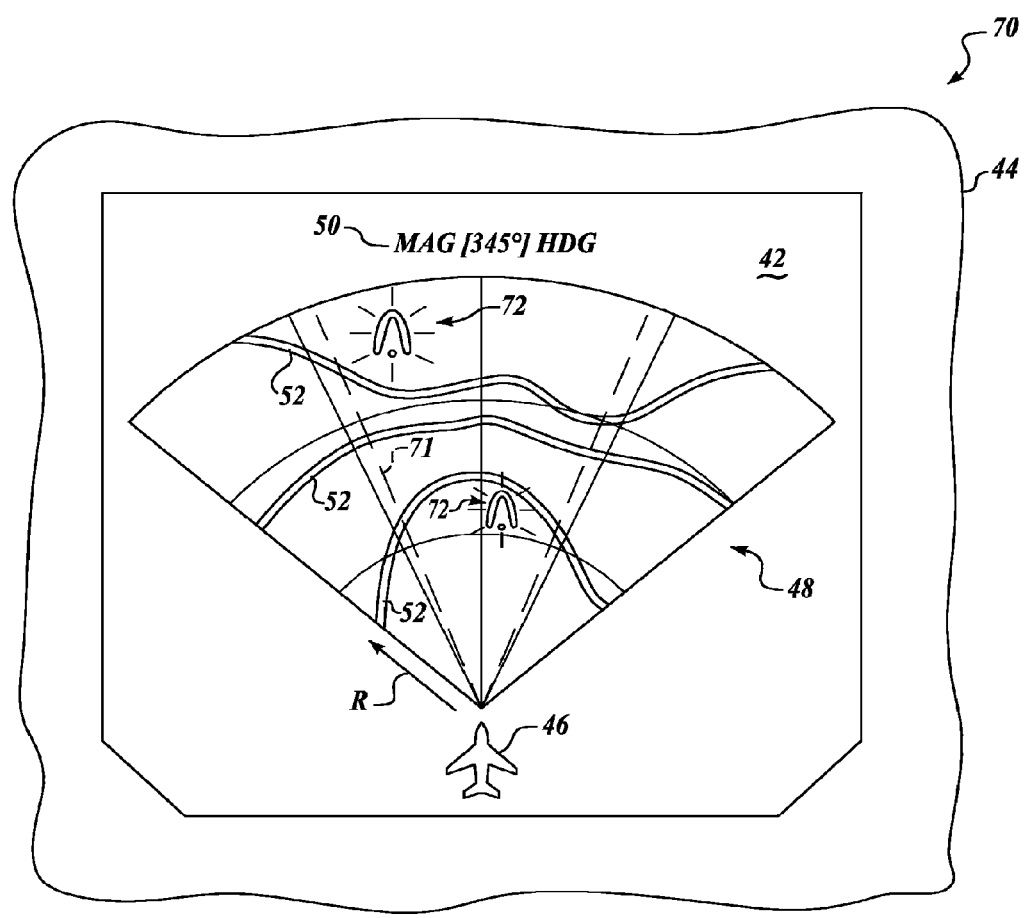
FIG. 3 is a ground obstacle depiction that describes a method of display management according to still another embodiment of the invention.

FIG. 3 is a ground obstacle depiction 70 that will be used to describe a method of display management according to still another embodiment of the invention. As described more fully in connection with the previous embodiment, the ground obstacle symbology may be excluded from view on the viewing surface 42 in order to more directly view the terrain depicted on the viewing surface 42. Consequently, important ground obstruction symbols may not be present on the viewing surface 42 when required. Accordingly, in the present embodiment, the first display mode (wherein the ground obstruction symbols are excluded from view) is automatically overridden when one or more ground obstruction symbols 72 are within a predetermined range and bearing relative to the aircraft. For example, the ground obstruction symbols 72 may be otherwise excluded from view on the viewing surface 42 unless the symbols 72 are within a predetermined zone 71 relative to the aircraft. When the symbols 72 are within the predetermined zone 71, the symbols 72 are automatically presented for view on the TAD 44.

Figure 4:
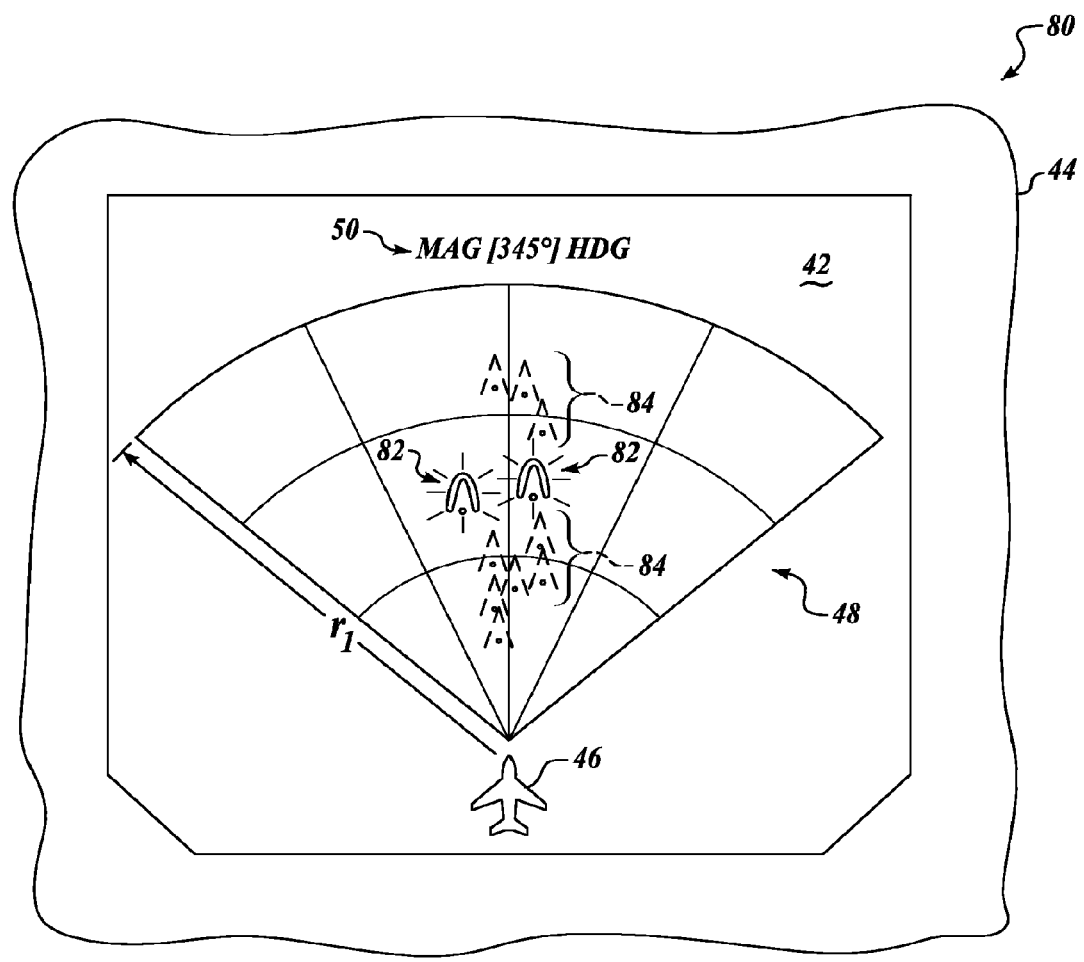
FIG. 4 is a ground obstacle depiction that describes a method of display management according to still yet another embodiment of the invention.

FIG. 4 is a ground obstacle depiction 80 that will be used to describe a method of display management according to still another embodiment of the invention. As noted earlier, in some geographical locations, important terrain information may be partially obscured on the viewing surface 42 by an excessive number of ground obscuration symbols. For example, selected urban locations may include a large number of radio transmission towers, multi-story buildings, smokestacks and other similar structures that are relatively closely spaced apart that partially or even substantially obscure various terrain details present on the display. Furthermore, as the range R (FIG. 2) of the TAD 44 is increased, the degree of ground obstruction symbol clutter also increases. Accordingly, in the present embodiment, the viewing surface 42 is automatically de-cluttered when a predetermined range value is selected for the TAD 44. In a particular embodiment, the predetermined range $r_1$ is approximately about ten miles. When the TAD 44 is de-cluttered, selected ground obstacle symbols 82 are presented on the viewing surface 42, while other ground obstacle symbols 84 are suppressed, and are not presented on the viewing surface 42. The selection of the ground obstacle symbols 82 may be based upon a relative altitude difference between the aircraft and a top portion of the obstacle corresponding to the ground obstacle 82, as described in detail in our co-pending U.S. patent application entitled "System and Method for Ground Proximity Warning with Enhanced Obstacle Depiction", U.S. application Ser. No. 10/907,934 filed Apr. 20, 2005, which application is incorporated herein by reference. Alternately, other methods may be used to select ground obstacle symbols 82 for display. In another particular embodiment, a slant range value may be calculated by the system 10 (FIG. 1) for each of the obstacles corresponding to the symbols 82 and 84, and if the calculated slant range value is equal to or less than a selected slant range value, a symbol is displayed. In one embodiment, the selected slant range value is approximately about two miles.

Figure 5:
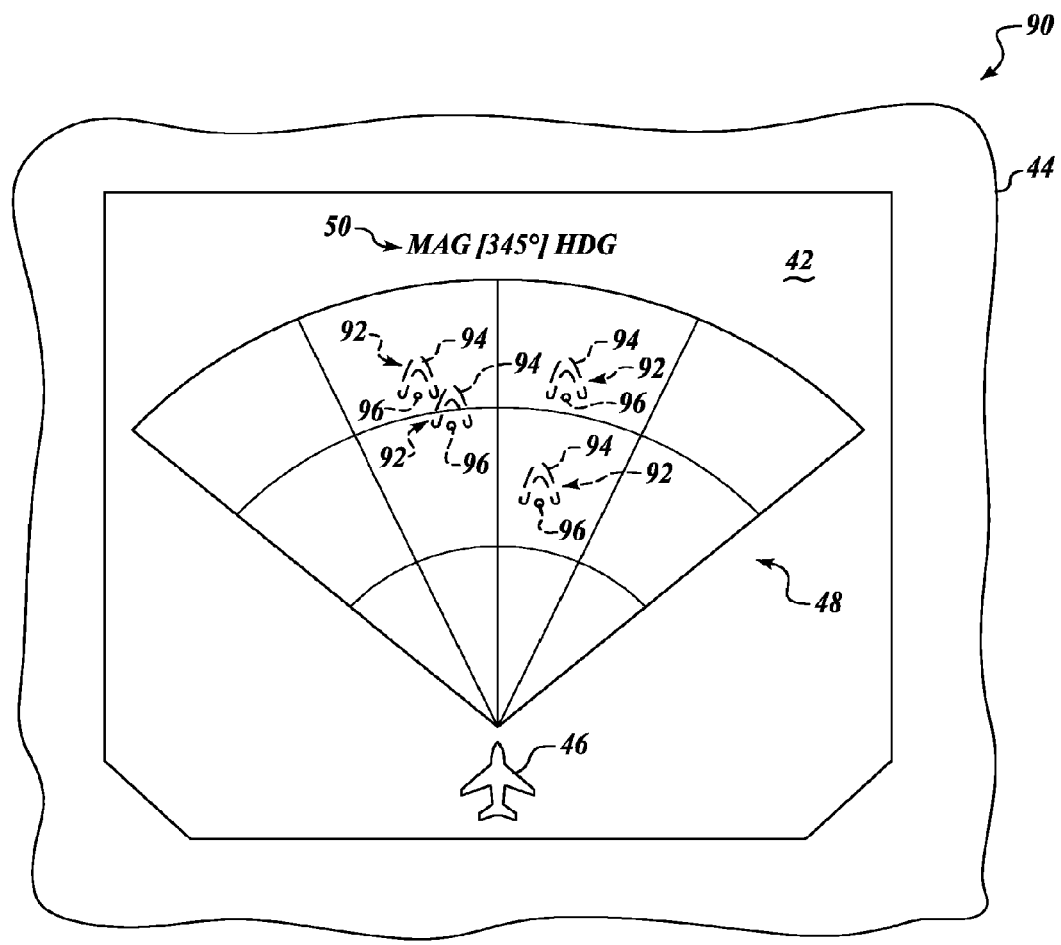
FIG. 5 is a ground obstacle depiction that describes a method of display according to another embodiment of the invention.

FIG. 5 is a ground obstacle depiction 90 that will be used to describe a method of display management according to still another embodiment of the invention. In order to avoid ground symbol clutter on the viewing surface 42 of the TAD 44, a first selected portion of a ground obstruction symbol 92 is suppressed, while a second selected portion of the ground obstruction symbol 92 is displayed. For example, the chevron portion 94 of the ground obstruction symbol 92 is suppressed, while the dot portion 96 is displayed on the TAD 44, thus reducing the level of clutter on the viewing surface 42 of the TAD 44. In another particular embodiment, the second selected portion of the ground obstruction symbol 92 may be displayed with a selected color that corresponds to a relative altitude difference between the aircraft and a top portion of the obstacle corresponding to the ground obstruction symbol 92. Accordingly, the second selected portion of the ground obstruction symbol 92 may be displayed with a first color if the corresponding ground obstruction is a predetermined first distance relative to the aircraft altitude, while the second selected portion is displayed with a second color if the corresponding ground obstruction is a predetermined second distance relative to the aircraft altitude. A third color may be used to depict the second selected portion when the corresponding ground obstruction is a predetermined third distance relative to the aircraft. In still another particular embodiment, the first color is red, and the first distance is more than two-thousand feet above the aircraft altitude, the second color is yellow, and the second distance extends from about five hundred feet below the aircraft altitude to about two-thousand feet above the aircraft altitude, while the third color is blue/cyan (or other color) and the third distance is at least five hundred feet below the aircraft altitude to about two-thousand feet below the aircraft altitude. Some form of visual contrast is provided when the obstacle and terrain are similar colors.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A ground proximity warning system for an aircraft, comprising:
    at least one aircraft sensor system operable to acquire aircraft data;
    a ground proximity warning computer coupled to the at least one aircraft sensor system that is operable to process the aircraft data to generate ground proximity warning data corresponding to a sensed man-made obstruction; and
    an indicating system including at least one visual display device that is configured to display an image of a visual symbol corresponding to the sensed obstruction, wherein at least one of the computer and the visual display device is controllable to selectively alter an appearance of the visual symbol,
    wherein at least one of the computer and the visual display device is configured to allow one to selectably alter a range setting for the visual display device, further wherein at least one visual symbol within the set range is suppressed or an alternate visual symbol is displayed for a previously presented visual symbol when a predetermined range setting is selected within the set range.

2. The ground proximity warning system of claim 1, wherein the at least one visual display device is further operable to display terrain elevations, and at least one of the computer and the visual display device is controllable to suppress all the terrain elevations while displaying the visual symbol.

3. The ground proximity warning system of claim 1, wherein the at least one visual display device is further operable to display terrain elevations, and at least one of the computer and the visual display device is controllable to suppress the visual symbol while displaying the terrain elevations.

4. The ground proximity warning system of claim 3, wherein at least one of the computer and the visual display device is configured to automatically display a suppressed visual symbol when the corresponding sensed obstruction is within a predetermined range of the aircraft.

5. The ground proximity warning system of claim 3, wherein at least one of the computer and the visual display device is configured to automatically display a suppressed visual symbol when the corresponding sensed obstruction is within a predetermined bearing relative to the aircraft.

6. The ground proximity warning system of claim 1, wherein the predetermined range value is at least about ten nautical miles.

7. The ground proximity warning system of claim 1, wherein at least one of the computer and the visual display device is configured to selectably alter a visual symbol displayed on the device.

8. The ground proximity warning system of claim 7, wherein the visual symbol includes a first portion and a second portion, and further wherein at least one of the computer and the visual display device is controllable to display the first portion while suppressing the second portion.

* * * * *